June 27, 1944.   L. WALLERSTEIN, JR   2,352,591
RESILIENT MOUNTING
Filed Nov. 14, 1942

Inventor
Leon Wallerstein Jr.
By
Attorney

Patented June 27, 1944

2,352,591

UNITED STATES PATENT OFFICE 2,352,591

RESILIENT MOUNTING

Leon Wallerstein, Jr., Erie, Pa., assignor to Lord Manufacturing Company, Erie, Pa., a corporation of Pennsylvania Application November 14, 1942, Serial No. 465,543

3 Claims. (Cl. 248—358)

Usually mountings are installed to reduce the vibratory effects on an instrument or apparatus subjected to vibratory impulses. In many instances the instrument or apparatus is very light and it is difficult to provide a rugged mounting that has sufficient softness to isolate the vibratory impulses. The present invention provides a mounting for very light equipment but can be readily fabricated and may be used with safety even under most trying conditions.

In carrying out the invention the mounting is provided with members spaced sufficiently apart to provide a gap between the members, which gap is extended at least in angular relations, preferably forming a complete annular gap. The space between the members is bridged along at least portions thereof by resilient material such as rubber arranged in the form of a U-shaped loop at an angle to the plane of the gap. Such a loop permits movement by the flexing or rolling of the sides and closed end of the loop in some directions. In the parts of the gap, however, extending more nearly in the direction of relative movement of the members, the walls of the loop are subjected to a greater amount of shear action than those parts of the loop arranged in the parts of the gap at a point where the members are moved toward and from each other.

Features and details of the invention will appear from the specification and claims.

Figure 1:
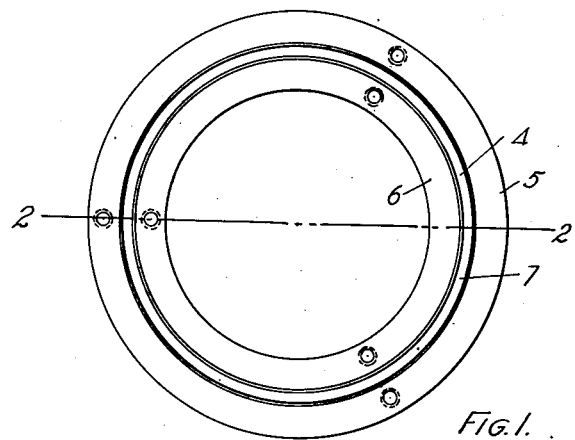

A preferred form of the mounting is exemplified in the accompanying drawing as follows:

Fig. 1 shows a plan view of the mounting viewed from the top.

Figure 2:
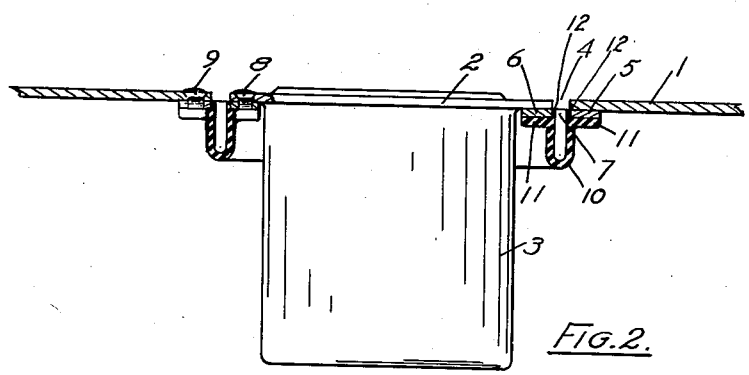

Fig. 2 a section on the line 2—2 in Fig. 1.

Figure 3:
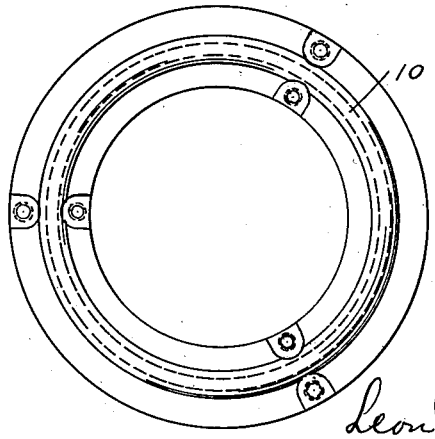

Fig. 3 a plan view of the rubber loop viewed from the bottom of the mounting.

1 and 2 mark supported and supporting members. These parts may have either relation and, as shown, 1 marks the outer member and 2 the inner member. As shown, a load 3 is secured to the inner member. A gap 4 is provided between the supported and supporting members and, as shown, is in the form of an annulus.

The mounting has an outer member 5 and an inner member 6. These are spaced apart forming an annular gap 7 between the members of the mounting. These mounting members are secured by screws 8 and 9 with the outer and inner supporting members.

A resilient element 10 is in the form of a U-shaped loop bridging the gap between the mounting members. The edges of the side walls of the loop are secured to the mounting members. Preferably the walls of the loop have flanges 11 which are bonded, as the U-shaped element is vulcanized, to the mounting members. Preferably the walls of the loop are extended into the gap, forming limited opposing faces 12 between the opposing edges of the mounting members. The faces between the members and the extension also provide a more secure attachment.

With this structure it will be noted that the walls of the loop yield to relative movement between the mounting members toward and from each other largely by flexure of the walls. That part of the element, however, in a portion of the gap at an angle to the direction of relative movement of the members, is subjected to more or less shear action adjacent to the attachment of the walls of the members and in that part of the walls of the element in which the walls extend in the general direction of relative movement of the members is subjected almost entirely to shear action of the walls. The resistance of the loop may be made more or less by varying the thickness of the walls of the loop and by varying its length.

In this way any tilting of the mounting is accommodated by the rolling of the part of the loop permitting a reverse rolling on reverse sides of the mounting. With the mounting members arranged in the same plane, and a vertically directed load thrust, the yielding resistance to the thrust is resisted by what might be termed a rolling action of the part of the loop which is essentially a bending of these parts.

With this structure a great softness may be attained and at the same time a rugged mounting provided where severe shocks are encountered.

The mounting of the rubber element may offset the inner and outer walls slightly so that with the gravity load the yielding of the walls of the loop under this load brings the outer and inner parts to the same level.

As shown in Fig. 1, such an arrangement has been provided, the outer and inner walls of the loop assuming under load the same level. The structure, however, may be formed with the walls of the loop of directly the same dimensions and the normal position of the element under load may be slightly offset without materially changing its functions.

As shown, the outer and inner members of the mounting are in the form of plates in the same plane, but in the broader aspects of the invention, different relations in this respect may be used.

What I claim as new is:

1. A mounting comprising members spaced apart forming an annular gap between them, and a connection between the members of resilient material, such as rubber, bridging the gap along at least portions thereof which are in angular relation, the connection extending out of straight line direct stress relation between the members, and the resistance to movement in any crosswise direction between the members being the resultant of shear and flexure resistances of the material in the said different portions of the gap.

2. A mounting comprising members spaced apart forming an annular gap between them, and a connection between the members of resilient material, such as rubber bridging the gap along at least portions thereof which are in angular relation, the portions being of U form in cross section, and the resistance to movement in any crosswise direction being the resultant of shear and flexure resistances of the material in the said different portions of the gap.

3. A mounting comprising members spaced apart forming an annular gap between them, a connection between the members of resilient material, such as rubber, bridging the gap along at least portions thereof which are in angular relation, the connection extending out of straight line direct stress relation between the members, and the resistance to movement in any crosswise direction being the resultant of shear and flexure resistances of the material in the said different portions of the gap, and material extending along the edge of the member facing the gap forming a stop limiting the edgewise relative movement of the members.

LEON WALLERSTEIN, Jr.